(12) United States Patent
Khan et al.

(10) Patent No.: US 11,475,255 B2
(45) Date of Patent: Oct. 18, 2022

(54) METHOD FOR ADAPTIVE CONTEXT LENGTH CONTROL FOR ON-LINE EDGE LEARNING

(71) Applicant: Kabushiki Kaisha Toshiba, Minato-ku (JP)

(72) Inventors: Aftab Khan, Bristol (GB); Timothy David Farnham, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 642 days.

(21) Appl. No.: 16/557,575

(22) Filed: Aug. 30, 2019

(65) Prior Publication Data

US 2021/0064941 A1 Mar. 4, 2021

(51) Int. Cl.
| | | |
|---|---|---|
| G06K 9/62 | (2022.01) | |
| G06N 3/04 | (2006.01) | |
| H04L 67/00 | (2022.01) | |
| G06N 5/04 | (2006.01) | |
| G06N 20/00 | (2019.01) | |

(52) U.S. Cl.
CPC ......... *G06K 9/6297* (2013.01); *G06K 9/6259* (2013.01); *G06N 3/0454* (2013.01); *G06N 5/04* (2013.01); *G06N 20/00* (2019.01); *H04L 67/34* (2013.01)

(58) Field of Classification Search
CPC .. G06K 9/6297; G06K 9/6259; G06N 3/0454; G06N 5/04; G06N 20/00; G06N 3/006; G06N 3/08; H04L 67/34; G06V 10/82
See application file for complete search history.

(56) References Cited

U.S. PATENT DOCUMENTS

| | | | | |
|---|---|---|---|---|
| 11,354,380 | B1* | 6/2022 | Andrews | G06F 16/9538 |
| 2004/0047353 | A1* | 3/2004 | Umayabashi | H04L 45/50 370/395.63 |
| 2013/0279508 | A1* | 10/2013 | Kano | H04L 45/742 370/392 |
| 2018/0032908 | A1* | 2/2018 | Nagaraju | G06F 11/3409 |
| 2019/0037638 | A1* | 1/2019 | Kasaragod | H04L 67/52 |
| 2019/0087509 | A1* | 3/2019 | Tago | G06N 3/105 |
| 2019/0116091 | A1* | 4/2019 | Bijavara Aswathanarayana Rao | G06N 5/047 |
| 2019/0258251 | A1* | 8/2019 | Ditty | G06V 20/58 |

(Continued)

OTHER PUBLICATIONS

Khan, A., et al., U.S. Appl. No. 16/042,027, filed Jul. 23, 2018.

*Primary Examiner* — Lewis G West
(74) *Attorney, Agent, or Firm* — Oblon, McClelland, Maier & Neustadt, L.L.P.

(57) ABSTRACT

A method of operating a network comprising an edge node and a server. The method comprises obtaining, by the edge node, a plurality of data samples, determining, by the edge node, a plurality of output labels by applying a first machine learning model using an input memory having a first input memory size to the plurality of data samples, calculating, by the edge node, an error term based on the confidence score of a first output label from the plurality of output labels, determining, by the edge node, based on the error term, whether to modify the first input memory size of the machine learning model and, if so, generating a second machine learning model based on the first machine learning model and a second input memory size.

20 Claims, 8 Drawing Sheets

(56) References Cited

U.S. PATENT DOCUMENTS

| | | | | |
|---|---|---|---|---|
| 2019/0354809 A1* | 11/2019 | Ralhan | .............. | G06F 16/90332 |
| 2020/0084113 A1* | 3/2020 | Joshi | ................... | H04L 41/5045 |
| 2020/0310394 A1* | 10/2020 | Wouhaybi | ........... | G06F 11/2023 |
| 2022/0043547 A1* | 2/2022 | Jahjah | .................... | G06V 10/40 |

* cited by examiner

METHOD FOR ADAPTIVE CONTEXT LENGTH CONTROL FOR ON-LINE EDGE LEARNING

FIELD

Embodiments described herein relate generally to edge computing and in particular to minimising memory use in edge devices.

BACKGROUND

The number of IoT, or Internet-of-Things, devices has grown in recent years and is expected to continue growing in the future. Such a significant growth in IoT devices requires highly scalable solutions for processing the large amount of data generated by each device. Traditional approaches to processing this data involve the IoT device transmitting all of the generated data for processing by a central server. This approach is generally undesirable because in the presence of multiple devices the load on the server will increase considerably and will result in an increased latency. This effect is most pronounced for IoT applications that require real-time operation. In this case, the only available option to reduce the processing latency is to upgrade the server, thereby increasing the cost associated with large-scale IoT deployments.

One way to reduce the processing burden imposed by the IoT devices on the centralised server is to process the generated data on the IoT device itself or in a gateway device. By enabling decision making capabilities at the edge of the network (i.e. at the IoT or gateway device) it is possible communicate only the result of the decision making process, thereby reducing the processing burden on the centralised server.

One way to process data at the IoT device is to use a pre-trained machine learning model that makes predictions and inferences based on the data generated by the IoT device. In order to achieve a high accuracy it is important to keep the decision-making capability (i.e. the machine learning model) of the edge node up to date. For example, if a new sequence of measurement data is encountered by an edge device the pre-trained decision making model could make an inaccurate prediction or inference since the model has not been trained to recognise this specific event.

In light of this a new approach to edge processing is required which efficiently maintains the accuracy of a machine learning model deployed on an edge node.

Arrangements of the embodiments will be understood and appreciated more fully from the following detailed description, made by way of example only and taken in conjunction with drawings in which.

DETAILED DESCRIPTION

According to an embodiment there is provided a method of operating a network comprising an edge node and a server. The method comprises obtaining, by the edge node, a plurality of data samples, determining, by the edge node, a plurality of output labels by applying a first machine learning model using an input memory having a first input memory size to the plurality of data samples, calculating, by the edge node, an error term based on the confidence score of a first output label from the plurality of output labels, determining, by the edge node, based on the error term, whether to modify the first input memory size of the machine learning model and, if so, generating a second machine learning model based on the first machine learning model and a second input memory size.

In an embodiment generating the second machine learning model further comprises determining, by the edge node, a second input memory size based on the first input memory size and the error term, transmitting, by the edge node, a memory update request comprising a second input memory size, training, by the server, a second machine learning model using the second input memory size, transmitting, by the sever, the second machine learning model to the edge node and substituting, by the edge node, the first machine learning model with the second machine learning model.

In an embodiment the memory update request further comprises a first set of data samples which were input to the first machine learning model when the output was the first output label.

The network may further comprise a plurality of other edge nodes and the method may further comprise transmitting, by the server, the second machine learning model to the plurality of other edge nodes.

The error term may be generated based on a confidence score associated with the first output label and a ground truth being the first output label.

Determining whether to modify the first input memory size of the machine learning model may comprises comparing the error term to a first predetermined threshold and modifying the first input memory size if the error term is greater than a first predetermined threshold and greater than a second predetermined threshold, wherein the first predetermined threshold is smaller than the second predetermined threshold or the error term is less than the first predetermined threshold and the first memory size is greater than one.

Generating the second input memory size may comprise increasing the first input memory size when the error term is greater than the first predetermined threshold and the second predetermined threshold.

Generating the second input memory size may comprise decreasing the first input memory size when the error term is less than the first predetermined threshold and the first input memory size is greater than one.

The second memory size may be a sample step less than or greater than the first memory size. The sample step may be one sample. The sample step may be set using a machine learning process. The machine learning process may use one or more of current memory, learning memory and test error.

The method may further comprise selecting a label from the plurality of output labels as the first label if it is deemed to have a high probability of being representative of a ground truth.

The label from the plurality of output labels may be deemed to have a high probability of being representative of the ground truth if the label is preceded and succeeded, in a time series, by labels of the same type.

The method may further comprise the edge node using at least one of the first machine learning model or the second machine learning model to make a determination based on at least one of raw data and pre-processed raw data and the edge node transmitting a result of said determination to the server.

The method may further comprise the server generating said second machine learning model using at least one of raw data or pre-processed data previously received from edge nodes.

According to another embodiment there is provided an edge node comprising a processor and a memory storing program instructions for execution by the processor. The edge node is configured to, when executing said instructions, obtain a plurality of data samples, determine a plurality of output labels by applying a first machine learning model using an input memory having a first input memory size to the plurality of data samples, calculate an error term based on the confidence score of a first output label from the plurality of output labels, determine, based on the error term, whether to modify the first input memory size of the machine learning model and, if so, transmit to a server a request for a second machine learning model based on the first machine learning model and a second input memory size.

In an embodiment the edge node is further configured to determine a second input memory size based on the first input memory size and the error term, transmit a memory update request comprising a second input memory size, receive the second machine learning model and substitute the first machine learning model with the second machine learning model.

In an embodiment the edge node is further configured to base the error term on a confidence score associated with the first output label and a ground truth being the first output label.

In an embodiment determining whether to modify the first input memory size of the machine learning model comprises comparing the error term to a first predetermined threshold and modifying the first input memory size if the error term is greater than a first predetermined threshold and greater than a second predetermined threshold, wherein the first predetermined threshold is smaller than the second predetermined threshold or the error term is less than the first predetermined threshold and the first memory size is greater than one.

In an embodiment generating the second input memory size comprises increasing the first input memory size when the error term is greater than the first predetermined threshold and the second predetermined threshold.

In an embodiment generating the second input memory size comprises decreasing the first input memory size when the error term is less than the first predetermined threshold and the first input memory size is greater than one.

In an embodiment the edge node is further configured to select a label from the plurality of output labels as the first label if it is deemed to have a high probability of being representative of a ground truth.

In an embodiment the label from the plurality of output labels is deemed to have a high probability of being representative of the ground truth if the label is preceded and succeeded, in a time series, by labels of the same type.

In another embodiment a system comprising one or more edge node described hereinabove and a server is provided. The server comprises a processor and a memory storing program instructions for execution by the processor. The server is configured to, when executing said instructions, receive, from an edge node, a request to update a first machine learning model having a first input memory size to generate a second machine learning model having a second input memory size, wherein the second input memory size is specified in the request, generate a second machine learning model based on the first machine learning model and a second input memory size and transmit the second machine learning model to the edge node.

In an embodiment the server is further configured to generate said second machine learning model by training the model based on historic data received from edge nodes.

In general, an edge node is any electronic device that can form an endpoint of a network connection, or in other words a device that is located at the edge of a network. For example, an edge node could be an Internet-of-Things (IoT) device that is configured to collect and exchange data on a network.

As discussed above, one way of making decisions based on the raw measurement data is to use a machine learning model. Throughout the description the term "machine learning model" is used to represent a system which receives input data of a particular form and provides a result (an output) based on the data. The result may be predictive and/or indicative of a state of the edge node or the surrounding environment. Optionally, the input data to the machine learning model comprises a measurement of one or more of: a physical parameter, an operating parameter and/or a device parameter.

Figure 1A:
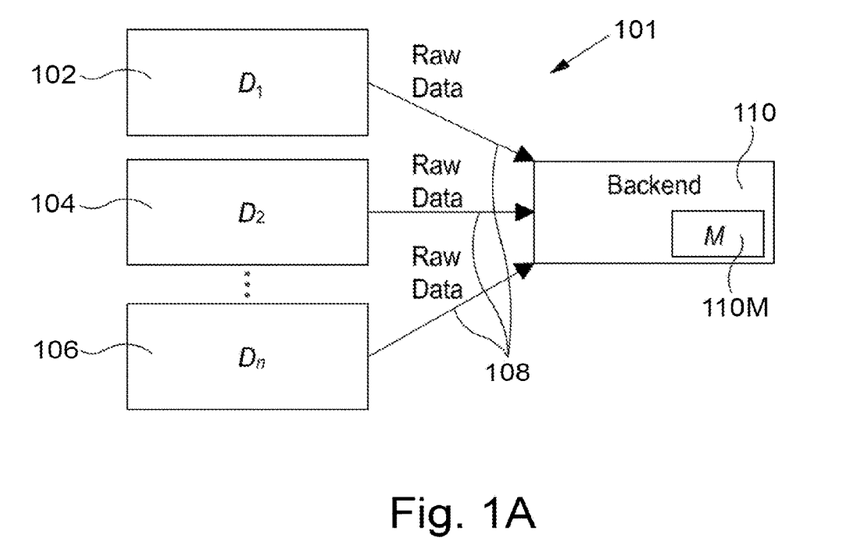
FIG. 1A shows a known approach to processing data generated by an edge node.

FIG. 1A shows a known approach to processing data generated by an edge node. FIG. 1A shows a system 101 comprising edge nodes 102 ($D_1$), 104 ($D_2$) and 106 ($D_n$) connected via a network 108 to a computer server 110 (i.e. a backend system). Although FIG. 1A shows three edge nodes it will be appreciated that there could be any number of edge nodes connected to the network 108 (i.e. up to n edge nodes). Optionally, the edge nodes 102, 104 and 106 include sensors to obtain raw measurement data.

The edge nodes 102, 104 and 106 transmit raw data (i.e. unprocessed data) through the network 108 to the computer server 110. The computer server 110 comprises a model 110M which is updated as the server 110 receives new raw data from the edge nodes 102, 104 and 106. In FIG. 1A the communication overhead is relatively large since raw data is being continuously transmitted by the edge nodes 102, 104 and 106. However, having all of the raw data accessible to the machine learning model 110M deployed on the server 110 allows the model 110M to be retrained based on the raw data itself and can lead to a model that is highly accurate and dynamic to new conditions.

An alternative approach is for the edge nodes 102, 104 and 106 to process the raw data and communicate the processed data to the computer server 110. This approach reduces the communication overhead associated with transporting data from the edge node and, at the same time, reduces the computational load on the computer server 110.

Figure 1B:
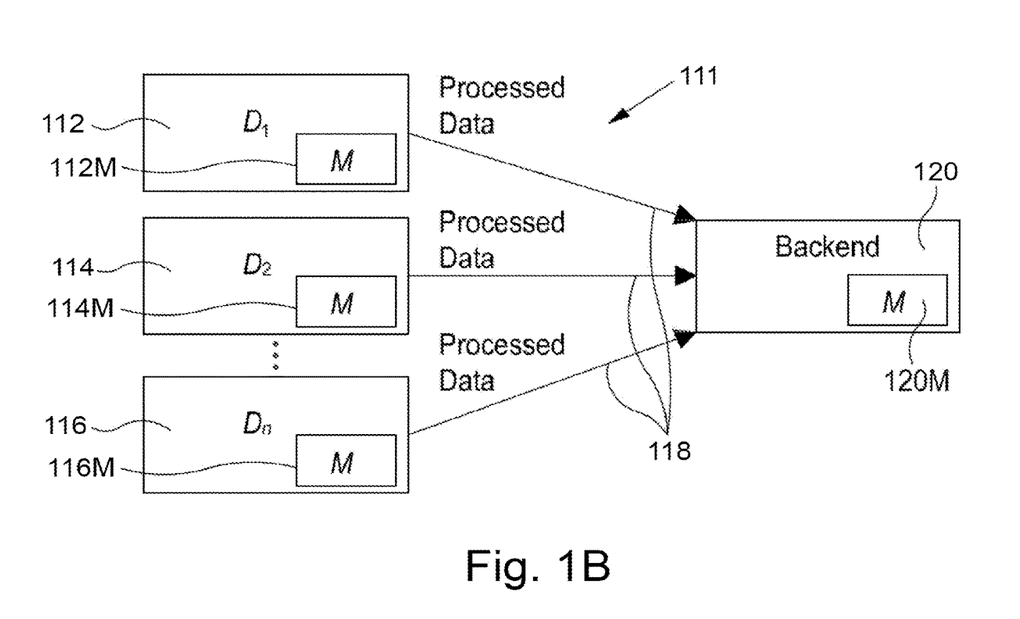
FIG. 1B shows a known approach to reducing the processing overhead of a server.

FIG. 1B shows a known approach to reducing the processing overhead of a server. FIG. 1B shows a system 111 comprising edge nodes 112 ($D_1$), 114 ($D_2$) and 116 ($D_n$) connected via a network 118 to a computer server 120 (i.e. a backend system). Optionally, the edge nodes 112, 114 and 116 include sensors to obtain raw measurement data. The edge nodes 112, 114 and 116 each have a respective local model 112M, 114M and 116M of the machine-learning process in order to generate processed data from the raw data.

The edge nodes 112, 114 and 116 transmit processed data via the network 118 to the computer server 120. Optionally, the processed data is transmitted by the edge nodes 112, 114 and 116 at predetermined time intervals.

The computer server 120 includes a model 120M which is updated as the computer server 110 receives processed data from the edge nodes 112, 114 and 116. This approach results in a reduced communication overhead since only the processed data (as opposed to the raw data) is transmitted by the edge nodes 112, 114 and 116. While reducing the communication overhead is advantageous, in this approach the models 112M, 114M and 116M can become outdated quickly resulting in inaccurate predictions.

Figure 2:
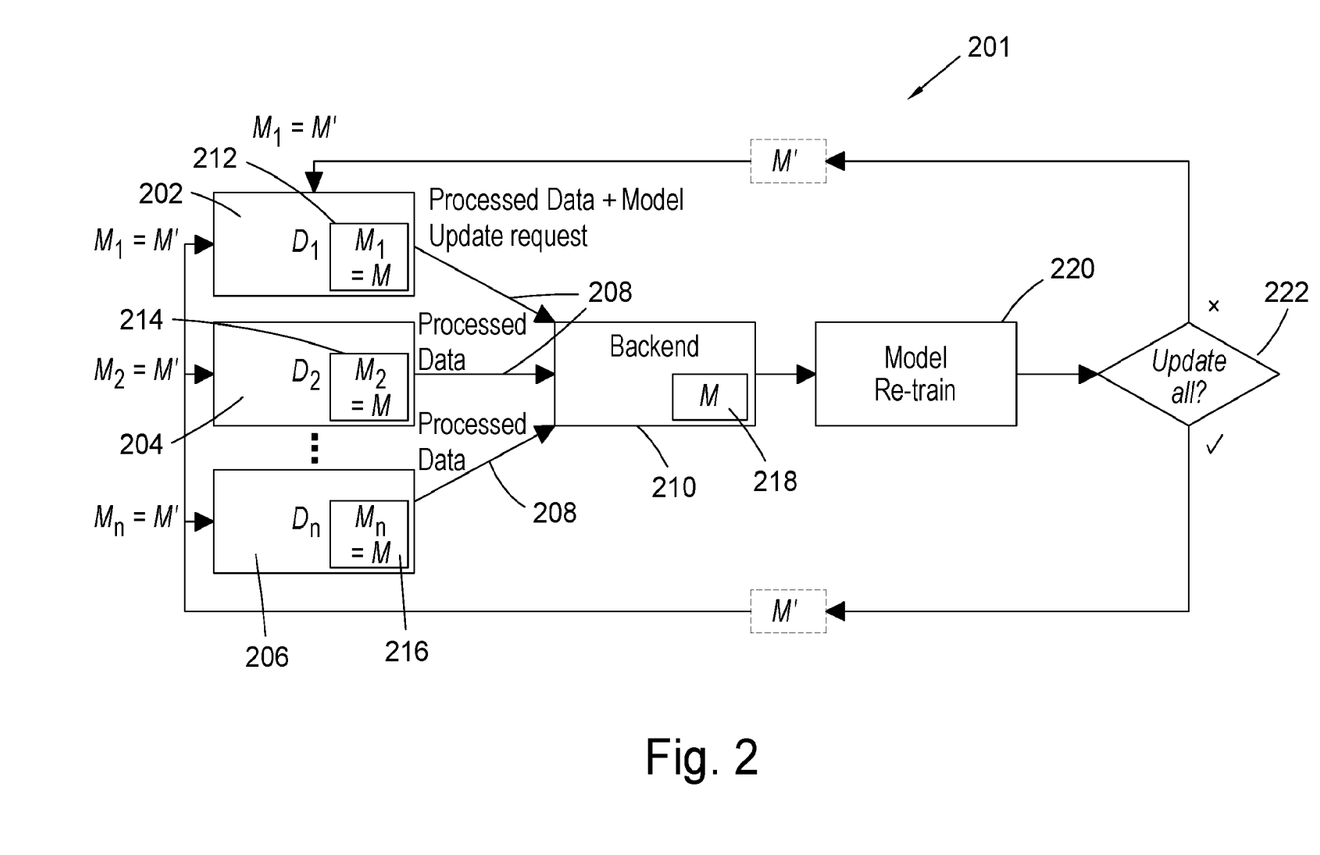
FIG. 2 shows a known confidence driven edge modelling system.

FIG. 2 shows a prior art confidence driven edge modelling method as described in U.S. non-provisional patent application Ser. No. 16/042,027, which is incorporated herein by reference.

FIG. 2 shows edge nodes 202 ($D_1$), 204 ($D_2$) and 206 ($D_n$) communicatively connected via a network 208 to a computer server 210 (i.e. a backend system). Although FIG. 2 shows three edge nodes, it will be appreciated that there could be any number of electronic devices connected to the network 208 (i.e. up to n edge nodes).

Each edge node 202 ($M_1$), 204 ($M_2$), 206 ($M_n$) comprises a respective local model 212 ($M_1$), 214 ($M_2$), 216 ($M_n$). The computer server 210 also comprises a global model 218 (M). The local models 212 ($M_1$), 214 ($M_2$) and 216 ($M_n$) at each of the respective edge nodes 202, 204 and 206 are copies of the global model 218 (M) at an instant in time (i.e. $M_1$=M).

The contents of the computer server 210 and the edge nodes 202, 204 and 206 will be discussed in more detail later. However for completeness it is noted that the computer server 210 stores the global machine learning model 218 (M) obtained by training a machine learning algorithm with recent and historical data. Optionally the local machine learning models are stored in the memory of the respective edge nodes. A processor of the edge node 202 is configured to obtain raw data and generate a prediction or inference using the local model 212 ($M_1$). Optionally the edge node pre-processes the raw data before applying the local model 212 ($M_1$).

During operation the edge node 202 makes prediction or inferences based on features extracted from raw data and communicates the result (i.e. the output of the local model 212 $M_1$) to the computer server 210.

As well as an output value (e.g. a prediction label) machine learning models also generate a confidence score associated with said output value. In some examples, the confidence score is represented by a probability estimate between 0 and 1. A confidence score closer to 1 represents a more confident prediction whereas a confidence score closer to 0 represents a less confident prediction.

Depending on the confidence value of the prediction it may be necessary to update the local model $M_1$ (for example, when the prediction confidence is low). In other words, based on the confidence in the prediction (generated using a local model $M_1$), a decision is made by the edge node 202 whether to update the global model M. If an update to the global model is required, the edge node 202 sends data and a model update request to the computer server 210.

There are a number of different types of data that could be communicated by the edge node 202 to accompany the model update request. These include the raw data, pre-processed data and/or the processed data. Raw data is data that has not been processed by the edge node 202. Pre-processed data represents data that has been processed in a manner that prepares it for use by the machine learning model. Pre-processing is optional depending on the nature of the raw data. Processed data includes feature data obtained by performing feature extraction on the raw data or the pre-processed data.

Optionally, the model update request is also accompanied by the output of the local model was generated when the data accompanying the model update request was used as an input to the machine learning model. Optionally, the decision regarding which type of data accompanies a model update request is made based on the confidence score of the machine learning model's output.

Following the receipt of an update request from an edge node 202 the computer server 210 updates the global model M using the data accompanying the model update request. Updating the global model M may comprise retraining 220 the global model M in view of the recently received data.

Once the global model M has been retrained 220, the computer server 210 communicates the updated model M' to the edge node 202 that requested a model update. Optionally 222 the computer server 210 sends the updated global model (M) to each of the edge nodes in communication with the computer server 210 (i.e. edge nodes 202, 204 and 206).

The above-described approach to processing raw data generated by an edge node has a reduced communications overhead since only processed data containing the new feature information is used to accompany the model update request. However, because the memory of the system is fixed there are instances where the machine learning model uses more computational resources than is strictly necessary in order to make an accurate prediction.

Figure 3:
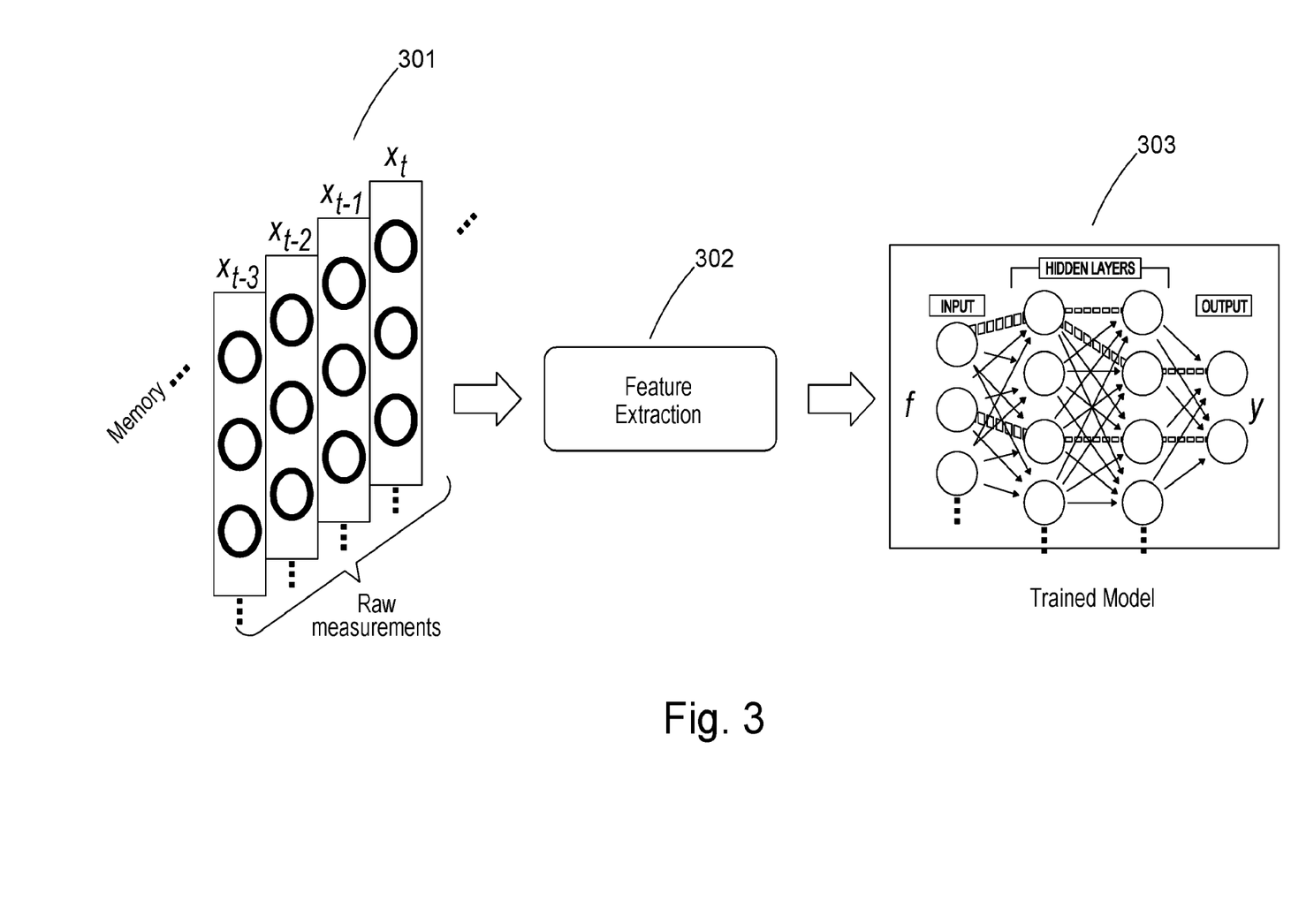
FIG. 3 shows an example of a machine learning system according to an embodiment.

FIG. 3 shows an example of a machine learning system according to an embodiment. FIG. 3 shows a plurality of raw data samples 301 to which feature extraction 302 is applied. Each one of the circles shown as part of a time series of raw data samples $X_{t-3}$, $X_{t-2}$, $X_{t-1}$ and $X_t$ in FIG. 3 represents a single raw data point. As shown in the examples discussed below each raw data point may include a plurality of measurement values, for example a plurality of values acquired at the same time from a corresponding plurality of sensors. In many systems data points are acquired frequently and the three circles shown in the individual time series of raw data samples $X_{t-3}$, $X_{t-2}$, $X_{t-1}$ and $X_t$ in FIG. 3 simply represent three consecutively acquired raw data points. The time series of raw data samples $X_{t-3}$, $X_{t-2}$, $X_{t-1}$ and $X_t$ represent the output of a windowing function applied over a continuous time series of raw data points. There may be overlap between adjacent time series, so that one or more data points are present in two or more adjacent time series. Alternatively, adjacent time series may be consecutive or may even have temporal gaps between them so that some raw data points may not be used.

As is shown in FIG. 3 all of the time series of raw data samples $X_{t-3}$, $X_{t-2}$, $X_{t-1}$ and $X_t$ are used during feature extraction 302. Whilst in one embodiment the size of the extracted features may be the same irrespective of the size of the raw data sample set 301 upon which feature extraction is based, the amount of system memory required for dealing with the raw data sample set 301 is proportional to the number of samples used during feature extraction in order to generate an input to the machine learning model. The number of samples required used is the product of the number of the time series (e.g. $X_{t-3}$, $X_{t-2}$, $X_{t-1}$ and $X_t$ in the example illustrated in FIG. 3) and the number of raw data points in each time series (e.g. 3 in the example illustrated in FIG. 3). The amount of system memory used is the product of the number of samples and the sample size.

If feature extraction was not used the product of the sample size and the number of samples required at the input to the machine learning model in order to generate an output prediction or inference would represent the memory of the system.

Having extracted features from the plurality of raw data samples 301, the features are processed by the machine learning model 303. In one embodiment, the machine learning model 303 is an artificial neural network.

In machine learning systems it is often more accurate to make predictions based on raw data samples. However this can come at the expense of an increased architecture size. As a result feature extraction 302 can be used to reduce the amount of data processed by the model.

Feature extraction 302 is a process by which an original data set is transformed into a reduced number of variables that contain relevant information for subsequent classification. By extracting features from the raw sample data it is possible to fix the size of the input to the machine learning model and therefore the size of the neural network used to implement the machine learning model deployed on the edge nodes.

Before feature extraction is performed the raw data samples 301 may be split up into segments from which the features can be extracted. Where the raw data is a time series, segmentation can be performed using a sliding window as illustrated in FIG. 3.

For example, consider a time series comprising a number of data samples such that at time instant t−2, data=X; at time instant t−1, data=Y; and at time instant t, data=Z etc. This time series can be re-arranged, or restructured, such that the value at the previous time-step is used to predict the value at the next time-step. Here the number of data samples over which features are extracted is known as the window size. Since predictions or inferences are made based on the extracted features the number of data samples in the window used to input data to feature extraction represents the memory of the input to the machine learning system.

Optionally the windows used for feature extraction may overlap. By way of an example, a first window may comprise samples for time instant t−3, t−2 and t−1 while a second window may comprise samples for time instant t−2, t−1 and t. In this case there is an overlap of raw data samples between the first and the second window. Optionally a 50% overlap may also be used.

It was realised that the optimum memory of a machine learning model can vary considerably from one application to another and that, accordingly, use of a non-preferred memory size can have a significant impact on the machine learning model's efficiency and accuracy. Extracting features and/or making predictions based on a large number of samples (i.e. using a larger memory) can lead to more accurate results. However this is at the expense of an increased inference cost (i.e. the computation time and resources required to generate an inference).

In light of this there is a need to reduce the memory used for making accurate inferences/predictions in a machine learning model. This is particularly important for large scale IoT networks where the individual IoT devices are often constrained in terms of power and/or computational resources.

Figure 4:
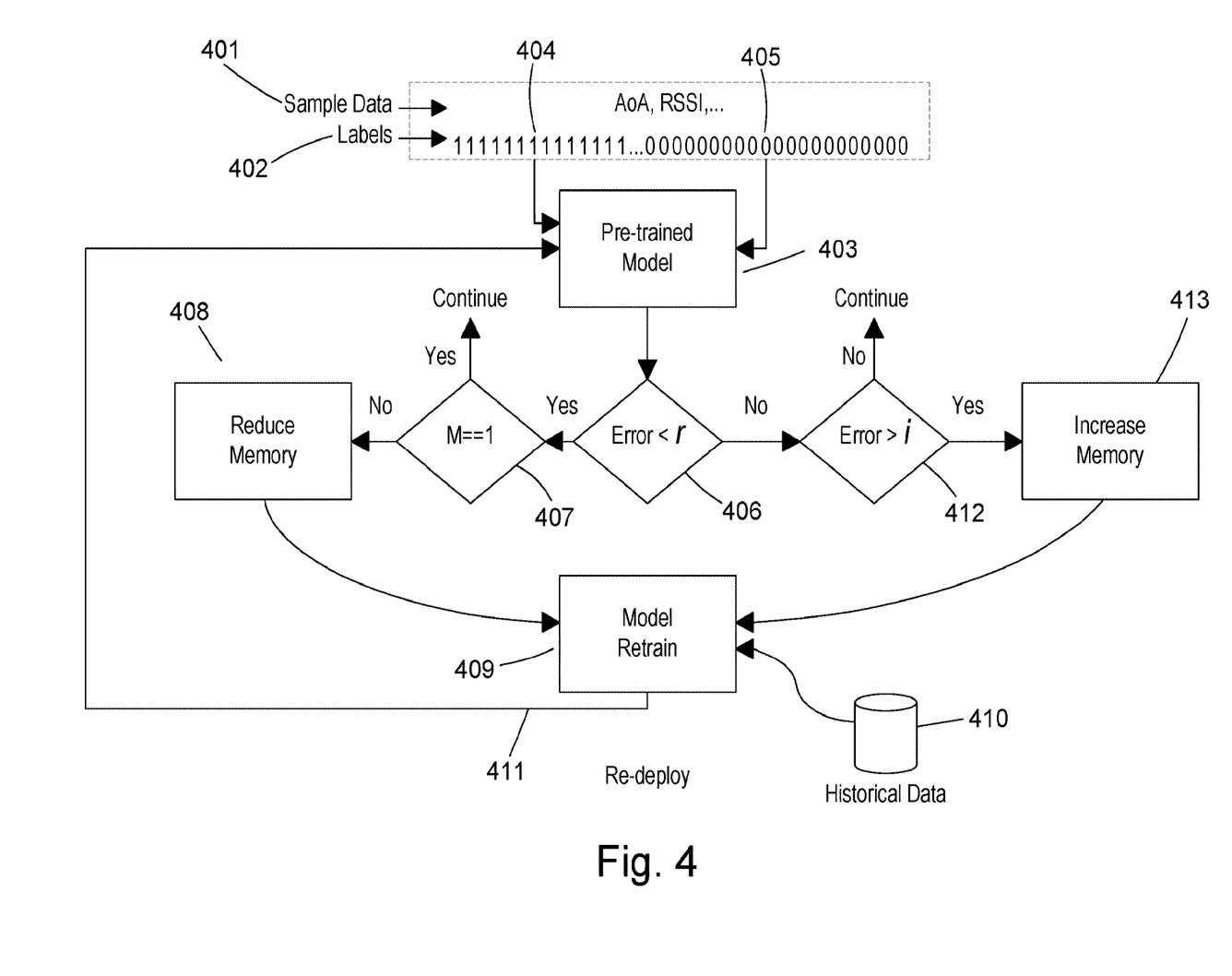
FIG. 4 shows a method of reducing the memory in an edge node according to an embodiment.

FIG. 4 shows a method of reducing the memory used by an edge node according to an embodiment. In an embodiment all of the steps performed in the method of FIG. 4, with the exception of step 409 are performed in the edge node. Step 409 is performed in a backend server that comprises the global/up-do-date model. Additionally the historical data 410 is provided on the server side.

The method shown in FIG. 4 is particularly advantageous in scenarios where frequent changes in the model output are rare. For example, in the case of remote keyless entry for vehicles, a key is routinely either inside or outside the vehicle for long periods of time. The method of FIG. 4 will be described with reference to its application in a remote keyless entry system. However, for the avoidance of doubt it is emphasized that the method is applicable to any application involving the use of machine learning on edge nodes (e.g. IoT devices). In particular the methods described below could be used in other machine learning applications where optimal memory lengths are difficult to set prior to deployment or where dynamic memory lengths are required. The latter is the case in the majority of real world applications, not least so in situations where the nature of the raw data changes, for example due to a change in human behaviour underlying the generation of raw data.

FIG. 4 shows sample data 401 comprising Angle of Arrival (AoA) and Received Signal Strength Indication (RSSI) measurements for each time instant. The input to the method also comprises labels 402 generated by the machine learning model based on the sample data 401.

In machine learning, labels represent the outputs of the model. For example, in a remote keyless entry system a label of '1' represents an inference that the remote key is inside a vehicle whereas a label of '0' represents an inference that the remote key is outside of the vehicle.

In FIG. 4 the labels represent a time series since their value changes over time. In FIG. 4 only the labels that are likely to be accurate are selected for use in the method.

Labels and their corresponding data samples are selected for use by the method based on the time series of the label and the assumption that frequent changes in the output label are rare. For example, the labels 402 show an event where the remote key transitions from being inside the vehicle (as represented by the label 1) to being outside the vehicle (as represented by the label 0).

Based on the assumption that frequent changes in the output state or label are rare it is possible to say, with a high degree of confidence, that labels surrounded by other labels of the same type are most probably correct. For example, FIG. 4 shows a first sample 404 and a second sample 405 which, at a different times, are used by the method. In an embodiment an output label is selected for use in the method if there are a predetermined number of labels of the same type either side (in a time series) of the label in question.

The sample data that the machine learning model used to generate the selected label is applied to the latest version of the machine learning model in step 403 and a confidence score (i.e. a likelihood that the label is correct) is obtained.

By selecting samples that are most probably correct (i.e. there is a very high degree of confidence in the generated label) it is possible to remove the need for ground truth when estimating the error present in the machine learning model.

In machine learning ground truth refers to a piece of information obtained by observation rather than inference, or in other words the ground truth is the real result or condition which the machine learning model predicts. In the method of FIG. 4, the label (i.e. the output of the machine learning model) is selected as the ground truth for the purpose of error computation. Consequently, the error of a data sample is derivable from the confidence score associated with the label. This is possible because a sample is selected based on the assumption that it is accurate.

In an embodiment in which the machine learning algorithm classifies, the error term is calculated by 1−confidence score, where the confidence score is a probability between 0 and 1. Alternatively, if the output of the machine learning algorithm is not a class label but a number out of a continuous range of numbers the error term can be calculated as the difference between a known true output and the output provided by the algorithm.

Having calculated an error term the method determines in step 406 whether the error term is below a predetermined threshold r. This determination indicates the quality of the current model.

If the error term is below the predetermined threshold r then the model is making accurate predictions for the current memory (i.e. the number of samples used in feature extraction). This determination represents an opportunity for the edge node to reduce the memory size allocated to storing the raw input data used in making predictions.

In step 407 the method determines whether the current memory size equals one data sample (i.e. the minimum amount of raw data samples required by the machine learning model to make a prediction).

If the memory size equals one then the memory can be reduced no further. In this case no further updates to the model on the edge node are required.

If, on the other hand, the current memory is greater than one sample, then the memory size is reduced in step 408. It will be appreciated that, in embodiments that use windowing (such as in the example illustrated in FIG. 3) this may involve either reducing the window size and/or reducing the number of windowed time series used as input to the machine learning method.

The model is subsequently retrained 409 using historical data 410 based on the updated memory size of the model. Where feature extraction is used step 409 comprises retraining the machine learning model based on receiving features extracted from the data using an updated size of the segments from which features are extracted such as, for example an updated window size. Historical data 410 is transmitted to the server in the manner discussed in co-pending patent application U.S. Ser. No. 16/042,027, the entirety of which is incorporated herein by reference.

Optionally the machine learning model is retrained using the raw data samples or feature extracted data which generated the selected output label.

If, in step 406 it is determined that the error term for the selected samples is greater than or equal to the predetermined threshold r then the method proceeds to step 412 where the method determines whether the error is greater than a predetermined threshold i. Threshold i is larger than threshold r.

The predetermined threshold i represents a form of hysteresis and is present to prevent the method from continually increasing and decreasing the memory for each selected sample. Instead of using the error to decide whether or not the memory size is to be updated the classification confidence score may be used in deciding whether or not the memory size is to be updated in step 406. A high confidence exceeding a predetermined first confidence threshold, for example, leads to the check performed in step 407 and a consequential possible reduction in memory size as described above. A confidence score that is lower than a second predetermined confidence threshold (wherein the second threshold is lower than the first threshold) in contrast leads to the check performed in step 412 and a consequential possible increase in memory size as described above.

If, in step 412 it is determined that the error is not greater than the predetermined threshold i (i.e. the threshold past which the memory is increased) then the method takes no action and the machine learning edge model is not updated.

If, on the other hand, it is determined that the error is greater than the predetermined threshold i, the method increases the memory size 413, i.e. the size of the segments of raw data from which features are extracted such as, this may, for example, be an increased window size, and retrains the model based on step 409 using the updated memory. Instead of or alternative to a change in window size the number of windows used may be changed to change the size of the memory used.

In steps 408 and 413 the memory size is respectively increased or reduced by one sample step (i.e. increasing or decreasing the amount of samples in the current memory size M by one sample). In an alternative embodiment a further machine learning technique is used to determine the optimum memory length using one or more of: the current memory size M, learning error, test error and other metrics. Optionally, this is achieved using a reinforcement learning technique.

In an embodiment reducing the memory 408 and increasing the memory 413 comprises communicating an update request to a computer server along with the increased or decreased memory parameters, i.e. the adjusted size of the segments of the raw data from which features are to be extracted, e.g. the adjusted window size.

After retraining the model in step 409, the model is then redeployed 411 to the edge node. Optionally, the model is deployed to all edge nodes in the network.

In an embodiment retaining the machine learning model occurs at a server remote from the edge node whereas each of the other steps are performed at the edge node. Optionally the server comprises storage that contains the historical data.

The above-described method has a number of advantages, namely that the model is eventually more optimal over time in terms of accuracy & efficiency and that model retraining is less likely to be triggered since only samples with a high confidence level are selected for testing the model.

Figure 5:
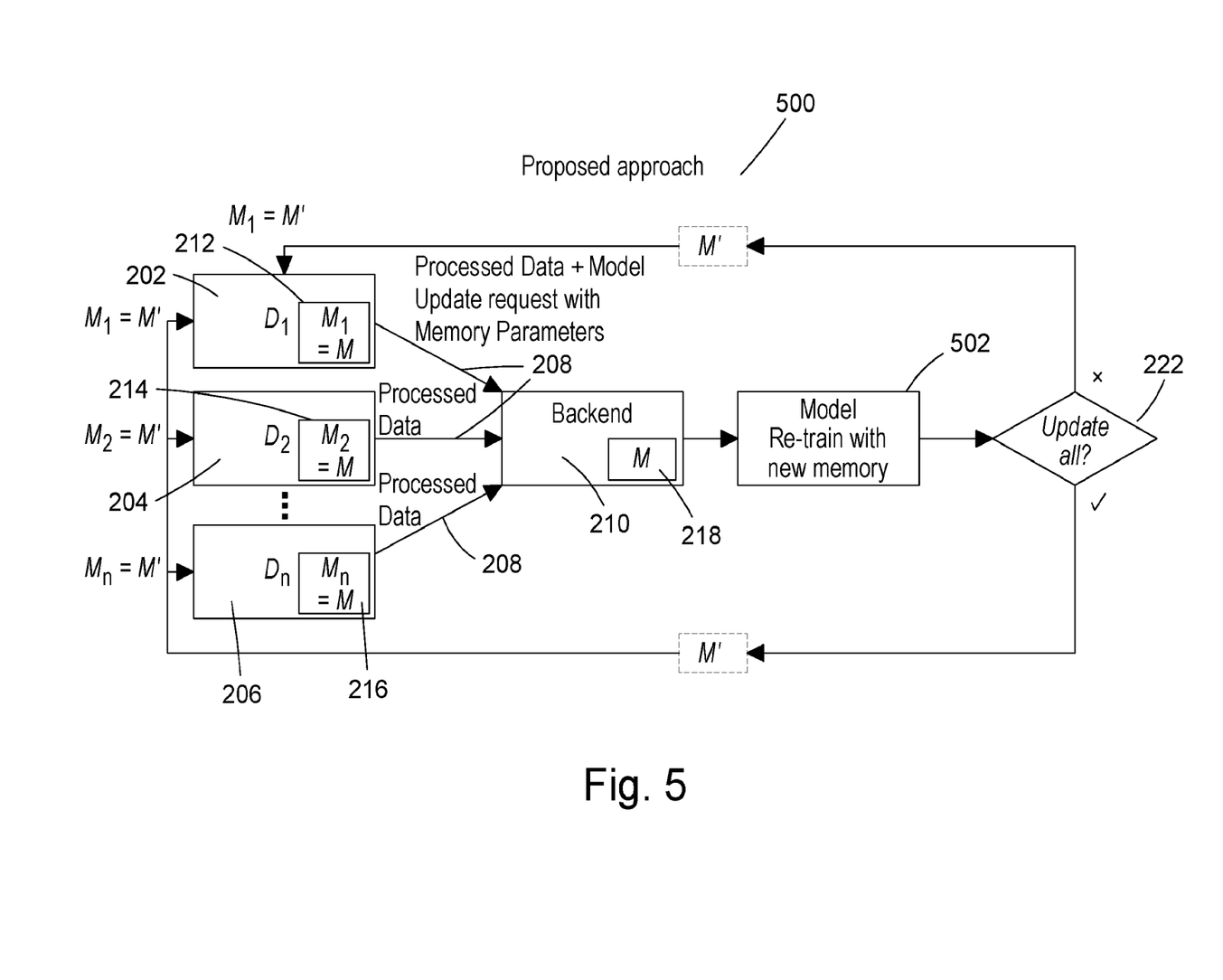
FIG. 5 shows a system for adaptive context length control of edge nodes according to an embodiment.

FIG. 5 shows a system for adaptive context length control of edge nodes according to an embodiment. FIG. 5 shows a system 500, which is similar to FIG. 2 and uses similar reference numerals to describe similar elements. As such, a detailed discussion of the components will be omitted.

In FIG. 5 a model update request comprising the updated memory size is communicated from the edge node 202 to the server 210 via the network 208. Upon receipt by the server 210 the machine learning model is retrained with the updated memory size 502 and the updated model is subsequently distributed to the requesting edge node 202 or to every edge node 202, 204 and 206 in the system.

In an embodiment steps 403, 406, 407, 408, 412 and 413 of FIG. 4 are carried out by an edge node (e.g. 202, 204 and 206) and step 409 is carried out by the computer server 210.

Although in the above embodiment the edge node 202 communicates data (either raw or processed) along with the local model result to the server 210 for processing it will be appreciated that, in alternative embodiments, the edge node could retrain the machine learning model locally.

The above described method of reducing the memory in an edge node was tested in a key localisation system that uses radio measurement data. In these tests the input data is sampled every two seconds and comprises data from four locations with two Received Signal Strength Indicator (RSSI) measurements and two Angle of Arrival (AoA) measurements. Each location represents one of four corners of the car where the measurements are taken. For a given timestamp, there are 16 measurements (4 locations×2 RSSI×2 AoA). Each window therefore has measurements for multiple times steps which are used for extracting a set number of features.

The method discussed above is compared against three other approaches to operating systems where machine learning models are deployed on edge nodes. The approaches tested include:

1. Static (Feature): A static model with feature extraction.

The first approach performs feature extraction on the raw measurement data, keeping the neural networks' input size constant. Moreover, the size of the memory used by the machine learning model for storing the raw input data upon which feature extraction is based is static (i.e. it doesn't change size).

2. Adaptive (Feature): An adaptive model with feature representation.

The second approach follows the method presented herein where the input memory size is dynamically adjusted depending on the error/confidence estimates. In this approach feature extraction is used to keep the size of the input to the neural network fixed.

3. Static (Raw): A static model using raw measurements.

In the third approach raw measurement data is used as the input to a machine learning model with a fixed (i.e. static) input memory size. In this case the model size and input memory size remain static despite the use of raw data.

4. Adaptive (Raw): An adaptive model that uses raw measurement data.

In a fourth approach the size of the memory is dynamically adjusted. However, as there is no feature extraction the raw measurement data is used as an input to the machine learning model. As a result, any changes in the size of the memory used in the model will result in a corresponding change to the architecture of the neural network. In the following results this approach was tested using a neural network where the hidden node size (i.e. the number of nodes in the neural network not exposed to network input/output connections) is set to 5 time the input node size.

Figure 6A:
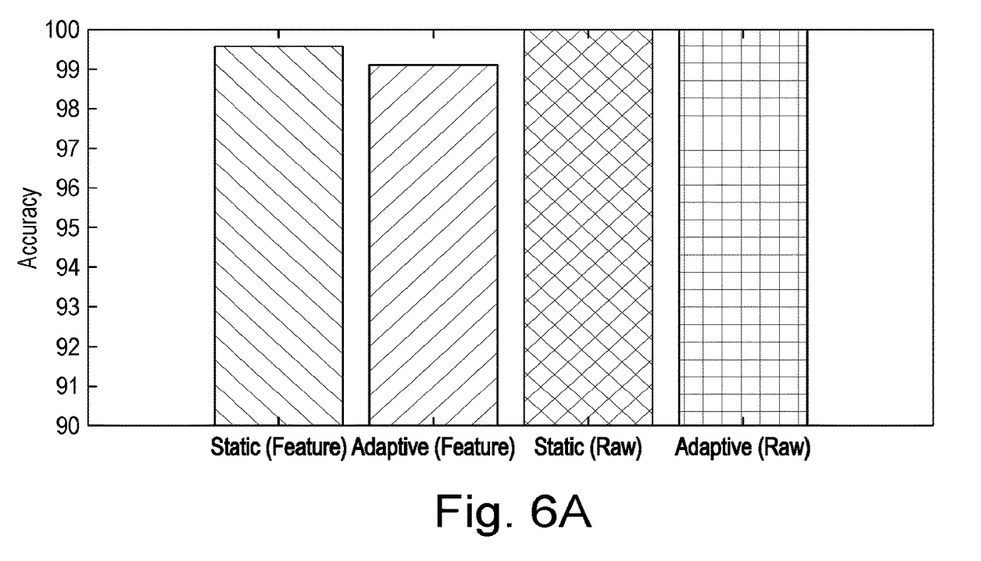
FIG. 6A shows the accuracy of various approaches to machine learning on edge nodes.

FIG. 6A shows the accuracy of various approaches to machine learning on edge nodes. FIG. 6A shows the accuracy of the above-described approaches in a remote key localisation application. More specifically. FIG. 6A shows that approaches which use feature extraction are 99% accurate at correctly classifying the location of the key whereas models which use raw data have 100% accuracy. It will of course be appreciated that approaches which use raw data often require more computational resources.

Figure 6B:
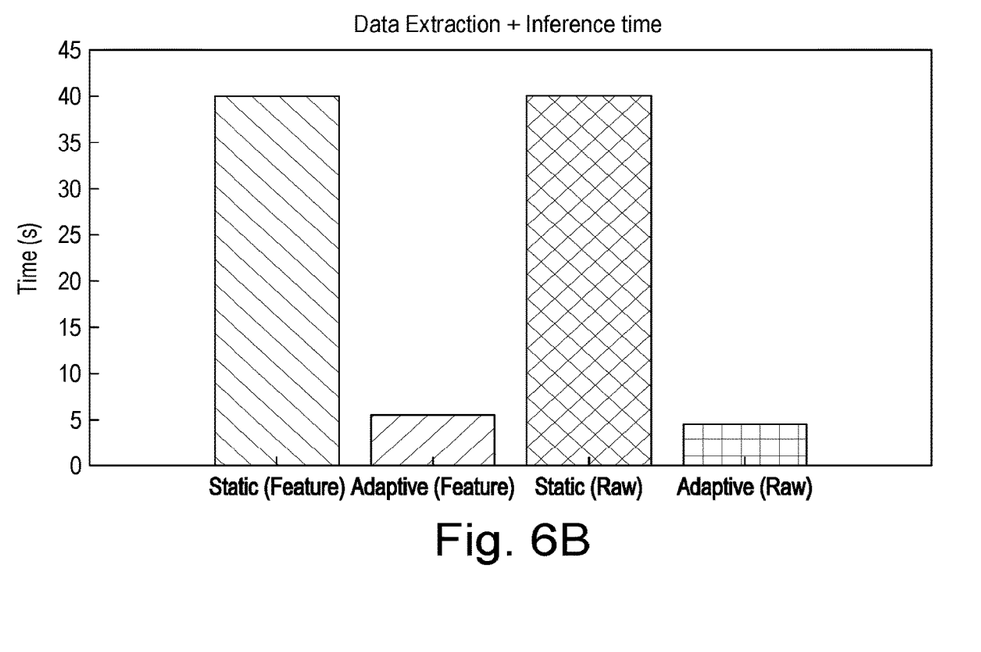
FIG. 6B shows the data extraction and inference times of various approaches to machine learning on edge nodes.

FIG. 6B shows the data extraction and inference times of various approaches to machine learning on edge nodes. FIG. 6B shows that for both cases where the memory of the model is static (i.e. Static (Feature) & Static (Raw)) the time required to observe, extract and test the raw data samples is significantly higher than the approaches where the memory length is adaptive.

Figure 7A:
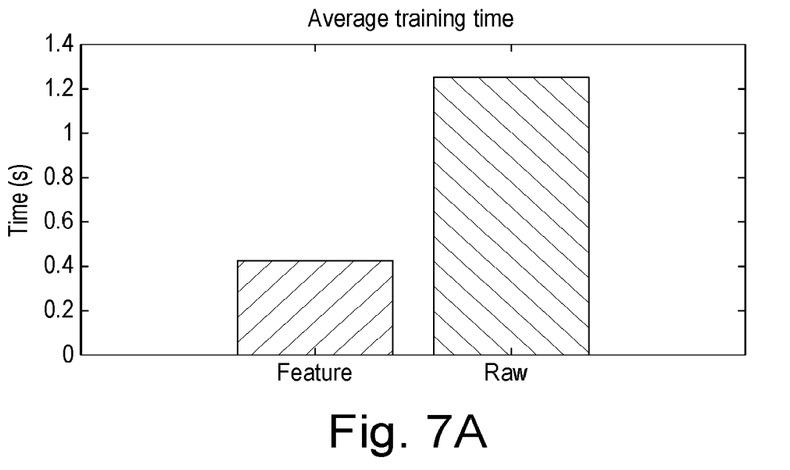
FIG. 7A shows the training time for models that use feature extracted data and raw measurement data.

FIG. 7A shows the training time for models that use feature extracted data and raw measurement data. FIG. 7A shows that there are significant differences in the training times depending on the type of data inputted to the machine learning model, in part due to the increased size of the neural network which is necessary to process the raw data.

This result demonstrates how it may be more challenging to keep a model that uses raw data up-to-date in a practical application and therefore the 100% efficiency of models that use raw data may be reduced in practice owing to the practical implications of retraining the model.

Figure 7B:
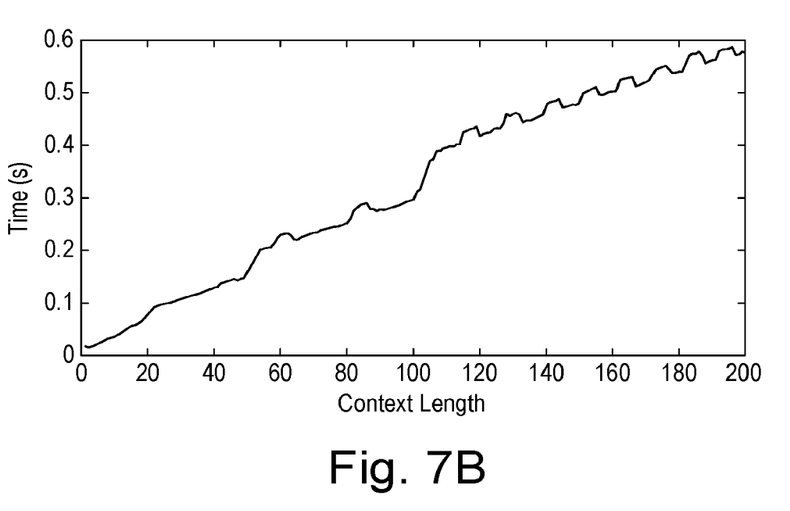
FIG. 7B shows the data extraction time with respect to the context length in terms of the number of samples.

FIG. 7B shows the data extraction time with respect to the context length in terms of the number of samples. FIG. 7B shows that as the context length increases so does the pre-processing time of the data. This result further confirms the need to have an appropriate context length, in order to reduce the amount of time spent extracting features from the raw measurement data. For example, static models with high accuracy often use a large memory, which as demonstrated by FIG. 7B results in a large data extraction time.

Figure 8A:
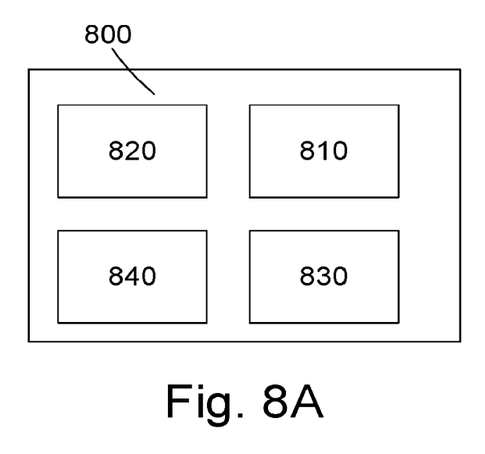
FIG. 8A shows an example of an edge node according to an embodiment.

FIG. 8A shows an example of an edge node according to an embodiment. The edge node 800 comprises a network interface 810, a processor 820 and a memory 830. The network interface 810 is configured to transmit and receive signals (via a wired or wireless connection). The processor 820 is configured to control the edge node 800 to perform the functions described herein. The memory 830 stores computer-readable instructions which, when executed by the processor 820, causes the processor 820 to enact the functionality described herein. Optionally, the edge node 800 comprises a sensor module 840 for generating raw data samples.

Figure 8B:
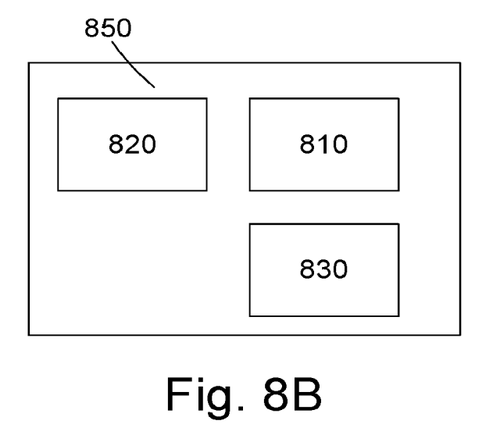
FIG. 8B shows an example of a computer server 850 according to an embodiment.

FIG. 8B shows an example of a computer server 850 according to an embodiment. The computer server 850 comprises similar components as the edge node 800, as indicated by like reference numerals. As a result, a detailed discussion will be omitted.

Although the method is discussed in relation to a key localisation application, other applications are also envisaged. For example, the above-described method could be used in an air quality monitoring system where air quality sensors are deployed in various parts of a city in order to makes predictions regarding future air quality.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method of operating a network comprising an edge node and a server, the method comprising:
   obtaining, by the edge node, a plurality of data samples;
   determining, by the edge node, a plurality of output labels by applying a first machine learning model using an input memory having a first input memory size to the plurality of data samples;
   calculating, by the edge node, an error term based on the confidence score of a first output label from the plurality of output labels;
   determining, by the edge node, based on the error term, whether to modify the first input memory size of the machine learning model; and if so:
   generating a second machine learning model based on the first machine learning model and a second input memory size.

2. A method according to claim 1 wherein generating the second machine learning model further comprises:

determining, by the edge node, a second input memory size based on the first input memory size and the error term;

transmitting, by the edge node, a memory update request comprising a second input memory size;

training, by the server, a second machine learning model using the second input memory size;

transmitting, by the sever, the second machine learning model to the edge node; and substituting, by the edge node, the first machine learning model with the second machine learning model.

3. A method according to claim 2 wherein the error term is generated based on:

a confidence score associated with the first output label; and a ground truth being the first output label.

4. A method according to claim 3 wherein determining whether to modify the first input memory size of the machine learning model comprises:

comparing the error term to a first predetermined threshold; and modifying the first input memory size if:
the error term is greater than a first predetermined threshold and greater than a second predetermined threshold, wherein the first predetermined threshold is smaller than the second predetermined threshold; or
the error term is less than the first predetermined threshold and the first memory size is greater than one.

5. A method according to claim 4 wherein generating the second input memory size comprises increasing the first input memory size when the error term is greater than the first predetermined threshold and the second predetermined threshold.

6. A method according to claim 5 wherein generating the second input memory size comprises decreasing the first input memory size when the error term is less than the first predetermined threshold and the first input memory size is greater than one.

7. A method according to claim 3 further comprising:
selecting a label from the plurality of output labels as the first label if it is deemed to have a high probability of being representative of a ground truth.

8. A method according to claim 7 wherein the label from the plurality of output labels is deemed to have a high probability of being representative of the ground truth if the label is preceded and succeeded, in a time series, by labels of the same type.

9. A method according to claim 1, further comprising:
the edge node using at least one of the first machine learning model or the second machine learning model to make a determination based on at least one of raw data and pre-processed raw data; and
the edge node transmitting a result of said determination to the server.

10. A method according to claim 1, further comprising:
the server generating said second machine learning model using at least one of raw data or pre-processed data previously received from edge nodes.

11. An edge node comprising a processor and a memory storing program instructions for execution by the processor, the edge node configured to, when executing said instructions:

obtain a plurality of data samples;

determine a plurality of output labels by applying a first machine learning model using an input memory having a first input memory size to the plurality of data samples;

calculate an error term based on the confidence score of a first output label from the plurality of output labels;

determine, based on the error term, whether to modify the first input memory size of the machine learning model; and if so:

transmit to a server a request for a second machine learning model based on the first machine learning model and a second input memory size.

12. An edge node as claimed in claim 11, further configured to:

determine a second input memory size based on the first input memory size and the error term;

transmit a memory update request comprising a second input memory size;

receive the second machine learning model; and substitute the first machine learning model with the second machine learning model.

13. An edge node as claimed in claim 12 further configured to base the error term on:

a confidence score associated with the first output label; and a ground truth being the first output label.

14. An edge node as claimed in claim 13, wherein determining whether to modify the first input memory size of the machine learning model comprises:

comparing the error term to a first predetermined threshold; and modifying the first input memory size if:
the error term is greater than a first predetermined threshold and greater than a second predetermined threshold, wherein the first predetermined threshold is smaller than the second predetermined threshold; or
the error term is less than the first predetermined threshold and the first memory size is greater than one.

15. An edge node as claimed in claim 14, wherein generating the second input memory size comprises increasing the first input memory size when the error term is greater than the first predetermined threshold and the second predetermined threshold.

16. An edge node as claimed in claim 15 wherein generating the second input memory size comprises decreasing the first input memory size when the error term is less than the first predetermined threshold and the first input memory size is greater than one.

17. An edge node as claimed in claim 14, further configured to:

selecting a label from the plurality of output labels as the first label if it is deemed to have a high probability of being representative of a ground truth.

18. An edge node as claimed in claim 17 wherein the label from the plurality of output labels is deemed to have a high probability of being representative of the ground truth if the label is preceded and succeeded, in a time series, by labels of the same type.

19. A system comprising one or more edge node as claimed in claim 13 and a server, the server comprising a processor and a memory storing program instructions for execution by the processor, the server configured to, when executing said instructions:

receive, from an edge node, a request to update a first machine learning model having a first input memory size to generate a second machine learning model having a second input memory size, wherein the second input memory size is specified in the request;

generate a second machine learning model based on the first machine learning model and a second input memory size; and transmit the second machine learning model to the edge node.

20. A system as claimed in claim 19, the server further configured to:

generate said second machine learning model by training the model based on historic data received from edge nodes.

* * * * *